US008738693B2

(12) United States Patent
Julia et al.

(10) Patent No.: US 8,738,693 B2
(45) Date of Patent: May 27, 2014

(54) SYSTEM AND METHOD FOR MANAGING DISTRIBUTION OF MEDIA FILES

(75) Inventors: Luc Julia, Oakland, CA (US); Laurent Delamare, Los Altos, CA (US); Yohan Le Nerriec, Berkeley, CA (US); Emmanuel Courreges, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1008 days.

(21) Appl. No.: 11/422,419

(22) Filed: Jun. 6, 2006

(65) Prior Publication Data

US 2007/0038771 A1 Feb. 15, 2007

Related U.S. Application Data

(63) Continuation-in-part of application No. 10/888,606, filed on Jul. 9, 2004, and a continuation-in-part of application No. 10/888,633, filed on Jul. 9, 2004, and a continuation-in-part of application No. 10/888,745, filed on Jul. 9, 2004, now Pat. No. 7,937,484.

(60) Provisional application No. 60/688,021, filed on Jun. 6, 2005.

(51) Int. Cl.
*G06F 15/16* (2006.01)

(52) U.S. Cl.
USPC ............................. 709/204; 709/214; 709/217

(58) Field of Classification Search
USPC .................. 709/204, 206, 217, 218, 246, 214
See application file for complete search history.

(56) References Cited

U.S. PATENT DOCUMENTS

| 5,034,807 A | 7/1991 | Von Kohorn |
| 5,132,992 A | 7/1992 | Yurt et al. |
| 5,253,275 A | 10/1993 | Yurt et al. |
| 5,550,863 A | 8/1996 | Yurt et al. |
| 5,661,516 A | 8/1997 | Carles |
| 5,719,786 A | 2/1998 | Nelson et al. |
| 5,774,170 A | 6/1998 | Hite et al. |
| 5,831,664 A | 11/1998 | Wharton et al. |

(Continued)

FOREIGN PATENT DOCUMENTS

| WO | WO 00/13688 A1 | 3/2000 |
| WO | WO 01/31852 A1 | 5/2001 |

(Continued)

OTHER PUBLICATIONS

U.S. Appl. No. 09/304,973, filed May 4, 1999, Balassanian.

(Continued)

*Primary Examiner* — Douglas Blair
(74) *Attorney, Agent, or Firm* — Mahamedi Paradice Kreisman LLP

(57) ABSTRACT

A system, method and technique are provided for managing distribution of digital images and other media. A host computer may store a library of media files, including digital images, such as those captured by a digital camera of a user. One or more applications may run on the host computer, or on an Internet service that communicates with the host computer, in order to enable management, sharing and distribution of images stored on the host computer. A remote device may be operated by the user or guest to cause remotely viewed images that reside on the host computer to be transferred to a print service or other third-party service with a corresponding network location.

22 Claims, 6 Drawing Sheets

(56) References Cited

U.S. PATENT DOCUMENTS

| | | | |
|---|---|---|---|
| 5,966,653 | A | 10/1999 | Joensuu et al. |
| 6,002,720 | A | 12/1999 | Yurt et al. |
| 6,101,534 | A | 8/2000 | Rothschild |
| 6,144,702 | A | 11/2000 | Yurt et al. |
| 6,157,621 | A | 12/2000 | Brown et al. |
| 6,161,133 | A | 12/2000 | Kikinis |
| 6,209,132 | B1 | 3/2001 | Harrison et al. |
| 6,212,282 | B1 | 4/2001 | Mershon |
| 6,263,503 | B1 | 7/2001 | Margulis |
| 6,263,505 | B1 | 7/2001 | Walker et al. |
| 6,310,886 | B1 | 10/2001 | Barton |
| 6,312,336 | B1 | 11/2001 | Handelman et al. |
| 6,327,608 | B1 | 12/2001 | Dillingham |
| 6,349,410 | B1 | 2/2002 | Lortz |
| 6,424,998 | B2 | 7/2002 | Hunter |
| 6,430,603 | B2 | 8/2002 | Hunter |
| 6,430,605 | B2 | 8/2002 | Hunter |
| 6,437,836 | B1 | 8/2002 | Huang et al. |
| 6,466,203 | B2 | 10/2002 | Van Ee |
| 6,466,971 | B1 | 10/2002 | Humpleman et al. |
| 6,470,378 | B1 | 10/2002 | Tracton et al. |
| 6,477,589 | B1 | 11/2002 | Suzuki et al. |
| 6,496,122 | B2 | 12/2002 | Sampsell |
| 6,545,722 | B1 | 4/2003 | Schultheiss et al. |
| 6,567,984 | B1 | 5/2003 | Allport |
| 6,605,038 | B1 | 8/2003 | Teller et al. |
| 6,611,863 | B1 | 8/2003 | Banginwar |
| 6,629,163 | B1 | 9/2003 | Balassanian |
| 6,658,461 | B1 | 12/2003 | Mazo |
| 6,670,974 | B1 | 12/2003 | McKnight et al. |
| 6,718,551 | B1 | 4/2004 | Swix et al. |
| 6,721,705 | B2 | 4/2004 | Kurganov et al. |
| 6,742,022 | B1 | 5/2004 | King et al. |
| 6,754,904 | B1 | 6/2004 | Cooper et al. |
| 6,754,907 | B1 | 6/2004 | Schumacher et al. |
| 6,757,684 | B2 * | 6/2004 | Svendsen et al. .................. 1/1 |
| 6,757,906 | B1 | 6/2004 | Look et al. |
| 6,763,226 | B1 | 7/2004 | McZeal, Jr. |
| 6,825,858 | B2 | 11/2004 | Sato |
| 6,826,589 | B2 | 11/2004 | Berrada |
| 6,836,786 | B1 | 12/2004 | Zoller et al. |
| 6,870,547 | B1 * | 3/2005 | Crosby et al. ................. 345/619 |
| 6,904,265 | B1 | 6/2005 | Valdivia et al. |
| 6,928,490 | B1 | 8/2005 | Bucholz et al. |
| 6,956,833 | B1 | 10/2005 | Yukie et al. |
| 6,957,086 | B2 | 10/2005 | Bahl et al. |
| 6,959,235 | B1 | 10/2005 | Abdel-Malek et al. |
| 6,968,179 | B1 | 11/2005 | De Vries |
| 6,975,836 | B2 | 12/2005 | Tashiro et al. |
| 7,010,002 | B2 | 3/2006 | Chow et al. |
| 7,065,778 | B1 | 6/2006 | Lu |
| 7,072,388 | B2 | 7/2006 | Blakenet et al. |
| 7,089,066 | B2 | 8/2006 | Hesse et al. |
| 7,098,772 | B2 | 8/2006 | Cohen |
| 7,127,261 | B2 | 10/2006 | Van Erlach |
| 7,130,582 | B2 | 10/2006 | Barilovits |
| 7,139,834 | B1 * | 11/2006 | Albanese et al. ............. 709/238 |
| 7,165,224 | B2 | 1/2007 | Pyhalammi |
| 7,177,872 | B2 | 2/2007 | Schwesig et al. |
| 7,177,881 | B2 | 2/2007 | Schwesig et al. |
| 7,188,312 | B2 | 3/2007 | Hsiu-Ping et al. |
| 7,209,817 | B2 | 4/2007 | Abdel-Malek et al. |
| 7,213,061 | B1 | 5/2007 | Hite et al |
| 7,213,766 | B2 | 5/2007 | Ryan et al. |
| 7,219,136 | B1 | 5/2007 | Danner et al. |
| 7,233,990 | B1 | 6/2007 | Debaty et al. |
| 7,246,009 | B2 | 7/2007 | Hamblen et al. |
| 7,260,600 | B1 | 8/2007 | Dunn et al. |
| 7,263,352 | B2 | 8/2007 | Neuhaus et al. |
| 7,271,780 | B2 | 9/2007 | Cok |
| 7,275,063 | B2 | 9/2007 | Horn |
| 7,280,533 | B2 | 10/2007 | Khartabil et al. |
| 7,284,046 | B1 | 10/2007 | Kreiner et al. |
| 7,292,588 | B2 | 11/2007 | Milley et al. |
| 7,310,680 | B1 | 12/2007 | Graham |
| 7,325,057 | B2 | 1/2008 | Cho et al. |
| 7,328,173 | B2 * | 2/2008 | Taratino et al. .................. 705/26 |
| 7,360,087 | B2 | 4/2008 | Jorgensen et al. |
| 7,363,258 | B2 * | 4/2008 | Svendsen et al. ............... 705/27 |
| 7,376,696 | B2 | 5/2008 | Bell et al. |
| 7,376,901 | B2 | 5/2008 | Shen et al. |
| 7,379,464 | B2 | 5/2008 | Kreiner et al. |
| 7,379,986 | B2 | 5/2008 | Kikinis |
| 7,468,744 | B2 | 12/2008 | Edwards et al. |
| 7,483,964 | B1 | 1/2009 | Jackson et al. |
| 7,486,926 | B2 * | 2/2009 | White et al. .................. 455/3.06 |
| 7,487,112 | B2 | 2/2009 | Barnes, Jr. |
| 7,502,795 | B1 * | 3/2009 | Svendsen et al. ..................... 1/1 |
| 7,519,393 | B2 | 4/2009 | Bahl et al. |
| 7,526,314 | B2 | 4/2009 | Kennedy |
| 7,561,299 | B2 * | 7/2009 | Elarde et al. .................. 358/1.7 |
| 7,565,547 | B2 * | 7/2009 | Matta et al. ................... 713/182 |
| 7,567,987 | B2 | 7/2009 | Shappell et al. |
| 7,617,279 | B2 * | 11/2009 | Nakajima et al. ............. 709/204 |
| 7,724,281 | B2 | 5/2010 | Vale et al. |
| 7,796,572 | B2 * | 9/2010 | Do et al. ....................... 370/338 |
| 7,895,445 | B1 * | 2/2011 | Albanese et al. ............. 713/185 |
| 7,957,357 | B2 | 6/2011 | Tysowski et al. |
| 8,018,850 | B2 | 9/2011 | Van Beek et al. |
| 8,028,096 | B2 * | 9/2011 | Brune et al. .................. 709/248 |
| 8,045,952 | B2 * | 10/2011 | Qureshey et al. ............. 455/344 |
| 8,050,652 | B2 * | 11/2011 | Qureshey et al. ............. 455/344 |
| 8,059,537 | B2 * | 11/2011 | Karaoguz et al. .......... 370/230.1 |
| 2001/0045985 | A1 | 11/2001 | Edwards et al. |
| 2001/0052019 | A1 | 12/2001 | Walters et al. |
| 2001/0052942 | A1 | 12/2001 | MacCollum et al. |
| 2001/0053274 | A1 | 12/2001 | Roelofs et al. |
| 2002/0002707 | A1 | 1/2002 | Ekel et al. |
| 2002/0010925 | A1 | 1/2002 | Kikinis |
| 2002/0013852 | A1 | 1/2002 | Janik |
| 2002/0026507 | A1 | 2/2002 | Sears et al. |
| 2002/0041398 | A1 | 4/2002 | Ikeda et al. |
| 2002/0046406 | A1 | 4/2002 | Chelehmal et al. |
| 2002/0056112 | A1 | 5/2002 | Dureau et al. |
| 2002/0059637 | A1 | 5/2002 | Rakib |
| 2002/0069309 | A1 | 6/2002 | Balassanian |
| 2002/0083342 | A1 * | 6/2002 | Webb et al. .................. 713/201 |
| 2002/0091848 | A1 | 7/2002 | Agresta et al. |
| 2002/0100063 | A1 | 7/2002 | Herigstad et al. |
| 2002/0105534 | A1 | 8/2002 | Balassanian |
| 2002/0108125 | A1 | 8/2002 | Joao |
| 2002/0124258 | A1 | 9/2002 | Fritsch |
| 2002/0131072 | A1 | 9/2002 | Jackson |
| 2002/0142721 | A1 | 10/2002 | Souissi et al. |
| 2002/0146237 | A1 | 10/2002 | Safadi |
| 2002/0147686 | A1 | 10/2002 | Safadi et al. |
| 2002/0162120 | A1 | 10/2002 | Mitchell |
| 2002/0188556 | A1 | 12/2002 | Colica et al. |
| 2002/0188867 | A1 | 12/2002 | Bushey et al. |
| 2003/0048295 | A1 | 3/2003 | Lilleness et al. |
| 2003/0063770 | A1 * | 4/2003 | Svendsen et al. ............. 382/100 |
| 2003/0065407 | A1 | 4/2003 | Johnson et al. |
| 2003/0065791 | A1 * | 4/2003 | Garg et al. .................... 709/229 |
| 2003/0093791 | A1 | 5/2003 | Julia |
| 2003/0093813 | A1 | 5/2003 | Shintani et al. |
| 2003/0105831 | A1 | 6/2003 | O'kane |
| 2003/0105854 | A1 | 6/2003 | Thorsteinsson et al. |
| 2003/0115284 | A1 | 6/2003 | Henry |
| 2003/0118014 | A1 | 6/2003 | Iyer et al. |
| 2003/0146977 | A1 | 8/2003 | Vale et al. |
| 2003/0149874 | A1 | 8/2003 | Balfanz et al. |
| 2003/0157960 | A1 | 8/2003 | Kennedy |
| 2003/0171135 | A1 * | 9/2003 | Brune et al. ................ 455/550.1 |
| 2003/0192054 | A1 | 10/2003 | Birks et al. |
| 2003/0200001 | A1 | 10/2003 | Goddard |
| 2003/0208472 | A1 | 11/2003 | Pham |
| 2003/0220835 | A1 | 11/2003 | Barnes |
| 2003/0220995 | A1 * | 11/2003 | Hitaka et al. .................. 709/223 |
| 2003/0229667 | A1 * | 12/2003 | Pedersen et al. ............. 709/206 |
| 2004/0003097 | A1 | 1/2004 | Willis et al. |
| 2004/0004663 | A1 | 1/2004 | Kahn et al. |
| 2004/0004737 | A1 | 1/2004 | Kahn et al. |
| 2004/0015589 | A1 | 1/2004 | Isozu |
| 2004/0015820 | A1 | 1/2004 | Balassanian |

(56) References Cited

U.S. PATENT DOCUMENTS

| | | | |
|---|---|---|---|
| 2004/0044723 A1 | 3/2004 | Bell et al. | |
| 2004/0045039 A1 | 3/2004 | Harrison et al. | |
| 2004/0049624 A1 | 3/2004 | Salmonsen | |
| 2004/0060071 A1 | 3/2004 | Shteyn | |
| 2004/0066419 A1 | 4/2004 | Pyhalammi | |
| 2004/0072584 A1 | 4/2004 | Kern | |
| 2004/0088731 A1* | 5/2004 | Putterman et al. | 725/94 |
| 2004/0097251 A1 | 5/2004 | Barilovits | |
| 2004/0097259 A1 | 5/2004 | Toor et al. | |
| 2004/0100974 A1 | 5/2004 | Kreiner et al. | |
| 2004/0103313 A1 | 5/2004 | Kreiner et al. | |
| 2004/0103437 A1 | 5/2004 | Allegrezza et al. | |
| 2004/0117442 A1 | 6/2004 | Thielen | |
| 2004/0117845 A1 | 6/2004 | Karaoguz et al. | |
| 2004/0117846 A1 | 6/2004 | Karaoguz et al. | |
| 2004/0117849 A1 | 6/2004 | Karaoguz et al. | |
| 2004/0123316 A1 | 6/2004 | Kendall et al. | |
| 2004/0133694 A1 | 7/2004 | Karaoguz et al. | |
| 2004/0139172 A1* | 7/2004 | Svendsen et al. | 709/219 |
| 2004/0148353 A1 | 7/2004 | Karaoguz et al. | |
| 2004/0172440 A1* | 9/2004 | Nakajima et al. | 709/200 |
| 2004/0177319 A1 | 9/2004 | Horn | |
| 2004/0192331 A1 | 9/2004 | Gorday et al. | |
| 2004/0205168 A1* | 10/2004 | Asher | 709/220 |
| 2004/0221163 A1 | 11/2004 | Jorgensen et al. | |
| 2004/0236442 A1 | 11/2004 | Maymudes | |
| 2004/0237122 A1 | 11/2004 | Yamaguchi et al. | |
| 2004/0250205 A1 | 12/2004 | Conning | |
| 2004/0267873 A1 | 12/2004 | Shen et al. | |
| 2005/0002640 A1 | 1/2005 | Putterman et al. | |
| 2005/0005025 A1 | 1/2005 | Harville et al. | |
| 2005/0021624 A1* | 1/2005 | Herf et al. | 709/204 |
| 2005/0021915 A1* | 1/2005 | Lowe et al. | 711/154 |
| 2005/0028208 A1 | 2/2005 | Ellis et al. | |
| 2005/0037706 A1 | 2/2005 | Settle | |
| 2005/0038923 A1 | 2/2005 | Kamataki | |
| 2005/0052469 A1* | 3/2005 | Crosby et al. | 345/619 |
| 2005/0055455 A1* | 3/2005 | Asher | 709/231 |
| 2005/0055716 A1 | 3/2005 | Louie et al. | |
| 2005/0062695 A1 | 3/2005 | Cok | |
| 2005/0076058 A1 | 4/2005 | Schwesig et al. | |
| 2005/0078620 A1 | 4/2005 | Balachandran et al. | |
| 2005/0083904 A1 | 4/2005 | Khartabil et al. | |
| 2005/0107031 A1 | 5/2005 | Wood et al. | |
| 2005/0114490 A1* | 5/2005 | Redlich et al. | 709/223 |
| 2005/0120073 A1 | 6/2005 | Cho | |
| 2005/0120391 A1 | 6/2005 | Haynie et al. | |
| 2005/0136949 A1 | 6/2005 | Barnes, Jr. | |
| 2005/0138560 A1 | 6/2005 | Lee et al. | |
| 2005/0153707 A1 | 7/2005 | Ledyard et al. | |
| 2005/0171661 A1 | 8/2005 | Abdel-Malek et al. | |
| 2005/0171692 A1 | 8/2005 | Hamblen et al. | |
| 2005/0172001 A1* | 8/2005 | Zaner et al. | 709/205 |
| 2005/0183120 A1 | 8/2005 | Jain et al. | |
| 2005/0198040 A1 | 9/2005 | Cohen et al. | |
| 2005/0198222 A1 | 9/2005 | Kohinata et al. | |
| 2005/0201358 A1 | 9/2005 | Nelson et al. | |
| 2005/0201529 A1 | 9/2005 | Nelson et al. | |
| 2005/0215194 A1 | 9/2005 | Boling et al. | |
| 2005/0223409 A1 | 10/2005 | Rautila et al. | |
| 2005/0229243 A1* | 10/2005 | Svendsen et al. | 726/12 |
| 2005/0232186 A1 | 10/2005 | Karaoguz et al. | |
| 2005/0234864 A1 | 10/2005 | Shapiro | |
| 2005/0235048 A1 | 10/2005 | Costa-Requena et al. | |
| 2005/0235329 A1 | 10/2005 | Karaoguz et al. | |
| 2005/0240558 A1 | 10/2005 | Gil et al. | |
| 2005/0242971 A1 | 11/2005 | Dryer | |
| 2005/0246757 A1 | 11/2005 | Relan et al. | |
| 2005/0256934 A1 | 11/2005 | Motoyama | |
| 2005/0259618 A1 | 11/2005 | Ahya et al. | |
| 2005/0283731 A1 | 12/2005 | Saint-Hilaire et al. | |
| 2005/0286497 A1 | 12/2005 | Zutaut et al. | |
| 2005/0289266 A1 | 12/2005 | Illowsky et al. | |
| 2006/0010225 A1* | 1/2006 | Issa | 709/217 |
| 2006/0010255 A1 | 1/2006 | Van Berkel et al. | |
| 2006/0010270 A1 | 1/2006 | Zhang | |
| 2006/0015649 A1 | 1/2006 | Zutaut et al. | |
| 2006/0015664 A1 | 1/2006 | Zhang | |
| 2006/0020960 A1 | 1/2006 | Relan et al. | |
| 2006/0026271 A1 | 2/2006 | Julia et al. | |
| 2006/0036354 A1 | 2/2006 | Mackawa et al. | |
| 2006/0047843 A1 | 3/2006 | Julia et al. | |
| 2006/0080452 A1 | 4/2006 | Julia et al. | |
| 2006/0085826 A1 | 4/2006 | Funk et al. | |
| 2006/0092176 A1 | 5/2006 | Wang et al. | |
| 2006/0095401 A1 | 5/2006 | Krikorian | |
| 2006/0095471 A1 | 5/2006 | Krikorian | |
| 2006/0095472 A1 | 5/2006 | Krikorian | |
| 2006/0161635 A1 | 7/2006 | Lamkin et al. | |
| 2006/0167985 A1 | 7/2006 | Albanese et al. | |
| 2006/0238335 A1 | 10/2006 | Karaoguz et al. | |
| 2006/0248554 A1 | 11/2006 | Priddy | |
| 2006/0253542 A1 | 11/2006 | McCausland et al. | |
| 2006/0253894 A1 | 11/2006 | Bookman et al. | |
| 2006/0256130 A1 | 11/2006 | Gonzalez | |
| 2006/0268738 A1 | 11/2006 | Goerke et al. | |
| 2006/0277318 A1 | 12/2006 | Julia et al. | |
| 2006/0280157 A1 | 12/2006 | Karaoguz et al. | |
| 2006/0288095 A1 | 12/2006 | Torok et al. | |
| 2007/0027957 A1 | 2/2007 | Peters et al. | |
| 2007/0061857 A1 | 3/2007 | Seki et al. | |
| 2007/0067407 A1 | 3/2007 | Bettis et al. | |
| 2007/0078948 A1 | 4/2007 | Julia et al. | |
| 2007/0101011 A1 | 5/2007 | Mrsic-Flogel et al. | |
| 2007/0118535 A1 | 5/2007 | Schwesig et al. | |
| 2007/0118619 A1 | 5/2007 | Schwesig et al. | |
| 2007/0168543 A1 | 7/2007 | Krikorian et al. | |
| 2007/0173266 A1 | 7/2007 | Barnes | |
| 2007/0189476 A1 | 8/2007 | Marsico et al. | |
| 2007/0198532 A1 | 8/2007 | Krikorian et al. | |
| 2007/0207755 A1 | 9/2007 | Julia et al. | |
| 2007/0213980 A1 | 9/2007 | Danner et al. | |
| 2007/0255785 A1 | 11/2007 | Hayashi et al. | |
| 2007/0260604 A1 | 11/2007 | Haeuser et al. | |
| 2007/0266169 A1 | 11/2007 | Chen et al. | |
| 2007/0280138 A1 | 12/2007 | Stern | |
| 2007/0294334 A1 | 12/2007 | Hickman | |
| 2008/0021921 A1 | 1/2008 | Horn | |
| 2008/0103975 A1* | 5/2008 | Taratino et al. | 705/57 |
| 2008/0127289 A1 | 5/2008 | Julia et al. | |
| 2008/0189766 A1 | 8/2008 | Bell et al. | |
| 2008/0232295 A1 | 9/2008 | Kreiner et al. | |
| 2008/0259818 A1 | 10/2008 | Balassanian | |
| 2008/0279098 A1 | 11/2008 | Park | |
| 2010/0017462 A1 | 1/2010 | Thoen | |
| 2010/0180307 A1 | 7/2010 | Hayes et al. | |
| 2010/0186034 A1 | 7/2010 | Walker | |
| 2011/0179140 A1 | 7/2011 | Julia et al. | |
| 2012/0158917 A1 | 6/2012 | Julia et al. | |
| 2012/0209958 A1 | 8/2012 | Julia et al. | |
| 2013/0086466 A1* | 4/2013 | Levy et al. | 715/234 |

FOREIGN PATENT DOCUMENTS

| | | |
|---|---|---|
| WO | WO 01/33839 A1 | 5/2001 |
| WO | WO 03/052552 A2 | 6/2003 |
| WO | WO 2005/122025 A2 | 12/2005 |
| WO | WO 2006/010023 A2 | 1/2006 |

OTHER PUBLICATIONS

U.S. Appl. No. 09/498,016, filed Feb. 4, 2000, Balassanian.
U.S. Appl. No. 10/118,587, filed Apr. 8, 2002, Balassanian.
U.S. Appl. No. 60/341,574, filed Dec. 17, 2001, Balassanian.
U.S. Appl. No. 60/341,932, filed Dec. 18, 2001, Balassanian.
U.S. Appl. No. 60/577,833, filed Jun. 7, 2004, Krikorian.
CITRIX, Winview for Networks, Installation Guide. 320pages, 1990-1994.
Discover Desktop Conference with NetMeeting 2.0, by Mike Britton and Suzanne Van Cleve. 305pages, 1997.
Final Office Action for U.S. Appl. No. 10/006,914 mailed Oct. 18, 2006, 15 pgs.
Final Office Action for U.S. Appl. No. 10/888,633 mailed Sep. 3, 2008, 25 pages.

(56) References Cited

OTHER PUBLICATIONS

Final Office Action for U.S. Appl. No. 10/888,745 mailed Sep. 2, 2008, 28 pages.
Final Office Action mailed Oct. 17, 2008 for US 2007/0207755 (U.S. Appl. No. 11/538,800) 16 pgs.
Final Office Action mailed Jul. 9, 2009 for U.S. Appl. No. 11/244,424 18 pages.
Final Office Action for U.S. Appl. No. 10/006,914 mailed Jun. 22, 2009, 15 pgs.
Final Office Action for U.S. Appl. No. 10/006,914 mailed Feb. 4, 2008, 18 pgs.
Goldberg, et al., The Ninja Jukebox, conference proceedings from the 2nd USENIX Symposium on Internet Technologies and Systems, Oct. 11-14, 1999, pp. 37-46, Boulder, Colorado.
International Search Report and Written Opinion of the International Searching Authority for PCT/US05/24324 mailed Jul. 20, 2007.
Network, The Authoratative Dictionary of IEEE Standards Terms, 7th Edition 2000.
Non-Final Office Action mailed Nov. 30, 2009 for U.S. Appl. No. 10/888,633, pp. 20.
Non-Final Office Action for U.S. Appl. No. 10/006,914 mailed Sep. 10, 2008, 23 pgs.
Non-Final Office Action for U.S. Appl. No. 10/888,633 mailed Jan. 9, 2008, 18 pages.
Non-Final Office Action for U.S. Appl. No. 10/006,914 mailed Jan. 26, 2008, 8 pgs.
Non-Final Office Action for U.S. Appl. No. 10/888,745 mailed Feb. 12, 2008, 15 pages.
Non-final Office Action mailed Sep. 15, 2008 for US 2006/0277318 (U.S. Appl. No. 11/244,424) 17 pgs.
Non-final Office Action mailed Jan. 17, 2008 for US 2007/0207755 (U.S. Appl. No. 11/538,800) 11 pgs.
Non-Final Office Action mailed Nov. 10, 2009 for U.S. Appl. No. 10/006,914, 24 pages.
Non-Final Office Action mailed Aug. 4, 2009 for U.S. Appl. No. 10/888,606, 24 pages.
Non-Final Office Action mailed Mar. 17, 2009 for U.S. Appl. No. 10/888,633, pp. 29.
Non-Final Office Action mailed Oct. 14, 2009 for U.S. Appl. No. 10/888,745, pp. 21.
Non-Final Office Action mailed Jun. 9, 2009 for U.S. Appl. No. 11/538,800, pp. 13.
Non-Final Office Action mailed Dec. 23, 2009 for U.S. Appl. No. 11/531,182, pp. 16.
Non-Final Office Action for U.S. Appl. No. 10/006,914 mailed Jun. 12, 2007, 20 pgs.
Non-Final Office Action mailed Jun. 24, 2009 for U.S. Appl. No. 11/531,182, pp. 16.
Path Construction for Multimedia Applications, website material from: bnrg.cs.berkeley.edu/~zmao/cs294-1/multimediaReport.doc, circa Oct. 1999.
TV Brick Home Server, web site as of Oct. 9, 2003, <http://www.tvbrick.com>, provided by <http://archive.org> 4 pages.
TV Brick Home Server, web site as of Mar. 22, 2004, <http://www.tvbrick.com>, provided by <http://archive.org> 4 pages.
TV Brick Home Server, web site as of Apr. 7, 2004, <http://www.tvbrick.com>, provided by <http://archive.org> 4 pages.
TV Brick Home Server, web site as of May 8, 2004, <http://www.tvbrick.com>, provided by <http://archive.org> 4 pages.
TV Brick Home Server, web site as of May 20, 2004, <http://www.tvbrick.com>, provided by <http://archive.org> 4 pages.
TV Brick Home Server, web site as of May 25, 2004, <http://www.tvbrick.com>, provided by <http://archive.org> 4 pages.
TV Brick Home Server, web site as of Jun. 8, 2004, <http://www.tvbrick.com>, provided by <http://archive.org> 4 pages.
TV Brick Home Server, web site as of Jun. 9, 2004, <http://www.tvbrick.com>, provided by <http://archive.org> 4 pages.
TV Brick Home Server, web site as of Jun. 29, 2003, <http://www.tvbrick.com>, provided by <http://archive.org> 4 pages.
TV Brick Home Server, web site as of Jul. 19, 2003, <http://www.tvbrick.com>, provided by <http://archive.org> 4 pages.
TV Brick Home Server, web site as of Dec. 2, 2003, <http://www.tvbrick.com>, provided by <http://archive.org> 4 pages.
TV Brick Home Server, web site as of Jun. 12, <http://www.tvbrick.com>, provided by <http://archive.org> 4 pages.
TV Brick Home Server, web site as of Jul. 1, 2004, <http://www.tvbrick.com>, provided by <http://archive.org> 4 pages.
TV Brick Home Server, web site as of Feb. 3, 2004, <http://www.tvbrick.com>, provided by <http://archive.org> 4 pages.
TV Brick Home Server, web site as of Feb. 10, 2004, <http://www.tvbrick.com>, provided by <http://archive.org> 4 pages.
TV Brick Home Server, web site as of Dec. 28, 2003, <http://www.tvbrick.com>, provided by <http://archive.org> 4 pages.
TV Brick Home Server, web site as of Jul. 4, 2003, <http://www.tvbrick.com>, provided by <http://archive.org> 4 pages.
TV 'brick' opens up copyright can of worms, by Benoit Faucon, The Wall Street Journal (from Australian Financial Review) Jul. 1, 2003, published online Oct. 20, 2003 on http://mex-at-the-blogspot.com/search?q=brick, 1 page.
Final Office Action for U.S. Appl. No. 11/531,182 mailed Aug. 31, 2010.
Final Office Action for U.S. Appl. No. 10/888,633 mailed Aug. 17, 2010.
Final Office Action for U.S. Appl. No. 10/888,745 mailed May 20, 2010.
Final Office Action for U.S. Appl. No. 10/888,606 mailed May 26, 2010, 36 pgs.
Non-Final Office Action for U.S. Appl. No. 11/244,424 mailed Jul. 7, 2010.
Final Office Action for U.S. Appl. No. 11/875,824 mailed Nov. 10, 2010.
Non-Final Office Action for U.S. Appl. No. 10/888,606 mailed Dec. 6, 2010.
Final Office Action mailed Mar. 15, 2010 for U.S. Appl. No. 11/538,800, 14 pages.
Non-Final Office Action for U.S. Appl. No. 11/875,824 mailed Mar. 2, 2010, 19 Pages.
Notice of Allowance for U.S. Appl. No. 10/888,745 mailed Mar. 4, 2011, 20 pages.
Final Office Action for U.S. Appl. No. 11/244,424 mailed Mar. 15, 2011, 28 pages.
Non-Final Office Action for U.S. Appl. No. 13/077,879 mailed Jun. 24, 2011, 4 pages.
Non-Final Office Action for U.S. Appl. No. 11/531,182 mailed Jul. 18, 2011, 18 pages.
Notice of Allowance for U.S. Appl. No. 11/538,800 mailed Nov. 25, 2011, 16 pages.
Co-pending U.S. Appl. No. 11/325,797, filed Jan. 3, 2006.
Doi, S., et al, "Real-Time Remote File System for Multimedia Application," Jul. 30, 2000, IEEE, vol. 3, pp. 1727-1730.
Liechti et al, "iRemote: a Platform for Controlling Public Displays with Mobile Phones", ATR Media Integration and Communication Research Lab, http://www.interaction-ipsj.org/archives/paper2001/pdf2001/olivier.pdf, Dec. 2000, all pages.
Lim, Swee Boon & Condry, Michael, "A Remote File System for Heterogenous Network Topologies," Nov. 15, 1993, IEEE, pp. 103-108.
Supplementary Partial European Search Report—EP05771205—Search Authority—The Hague—Oct. 25, 2011.

\* cited by examiner

SYSTEM AND METHOD FOR MANAGING DISTRIBUTION OF MEDIA FILES

RELATED APPLICATIONS

This application claims benefit of priority to U.S. Provisional Application No. 60/688,021, entitled "System and Method for Managing Distribution of Media Files," filed Jun. 6, 2005. The aforementioned application is hereby incorporated by reference in its entirety.

This application is also a continuation-in-part of the following, co-pending U.S. patent applications: U.S. patent application Ser. No. 10/888,606, entitled "System and Method for Enabling the Establishment of a Personal Network," filed Jul. 9, 2004; U.S. patent application Ser. No. 10/888,633, entitled "System and Method for Combining Memory Resources for Use on a Personal Network," filed Jul. 9, 2004; and U.S. patent application Ser. No. 10/888,745, entitled "System and Method for Remotely Controlling Network Resources," filed Jul. 9, 2004, now U.S. Pat. No. 7,937,484. All of the aforementioned priority applications are hereby incorporated by reference in their entirety for all purposes.

TECHNICAL FIELD

The disclosed embodiments relate generally to the field of digital photography, and more particularly, to managing the distribution of digital photographs.

BACKGROUND

There are an increasingly large number of devices that have network connectivity. Over the years, network connectivity has been extended to appliances such as refrigerators, home entertainment centers, and interactive box sets for use with television sets, digital cameras, and cell phones. With the evolution of these devices, there has been developments in home networks. For example, WIFI technology enables users to interconnect various network enabled devices wirelessly to form their own local area network. Various services and applications currently exist with the goal of establishing data connectivity between different network locations. The growth of the Internet and other types of networks has contributed to the numerous networking applications that currently exist.

There is also an interest in extending network connectivity to devices that can roam. These devices include cell phones, personal digital assistants (PDAs), and stations that can be assembled on vehicles or airplanes. While wireless networks for such roaming devices exist, these networks tend to have limited bandwidth, and can be expensive. In addition, it is difficult for operators of such devices to interact with networks, given that these devices often have poor user-interface features, and limited processing/memory resources for tasks that are often desired from them.

Currently, there are various interoperability issues when different types of network enabled devices are coupled. Often, the different devices operate on incompatible platforms or operating systems. This can cause problems in how these devices share data with one another. Furthermore, connected devices may use different data types (.WAV versus MPEG) and/or data formats that hinder the user's ability to share data amongst devices. As an example, the size of the screen display on a cell phone is typically too small to render images from a digital camera, even if the cell phone is camera-enabled. Often, the result is that when users want to share data amongst connected devices, that user must perform numerous manual steps, such as manually converting data formats.

Digital photography in particular has become more popular because the number of devices that provide image capturing functionality has increased dramatically. As digital photographs have become more commonplace, the desire of users to share such photographs has also dramatically increased. Now, users can almost instantly share digital images by sending them as attachments to emails or as Multimedia Message Service (MMS) images. However, digital images occupy considerable memory, so not all devices can handle images readily, at least with high resolution. Furthermore, the transmission of large image files is burdensome. Lastly, printing digital images remains costly. Many services exist for which users can transmit digital images (through email) for high-quality printing. These services allow the picture taker to invite others to see and order prints by first storing and making the digital images available on an intermediate server. Invitees can peruse the picture taker's folder and order their own pictures through the same print service.

DETAILED DESCRIPTION

Figure 1:
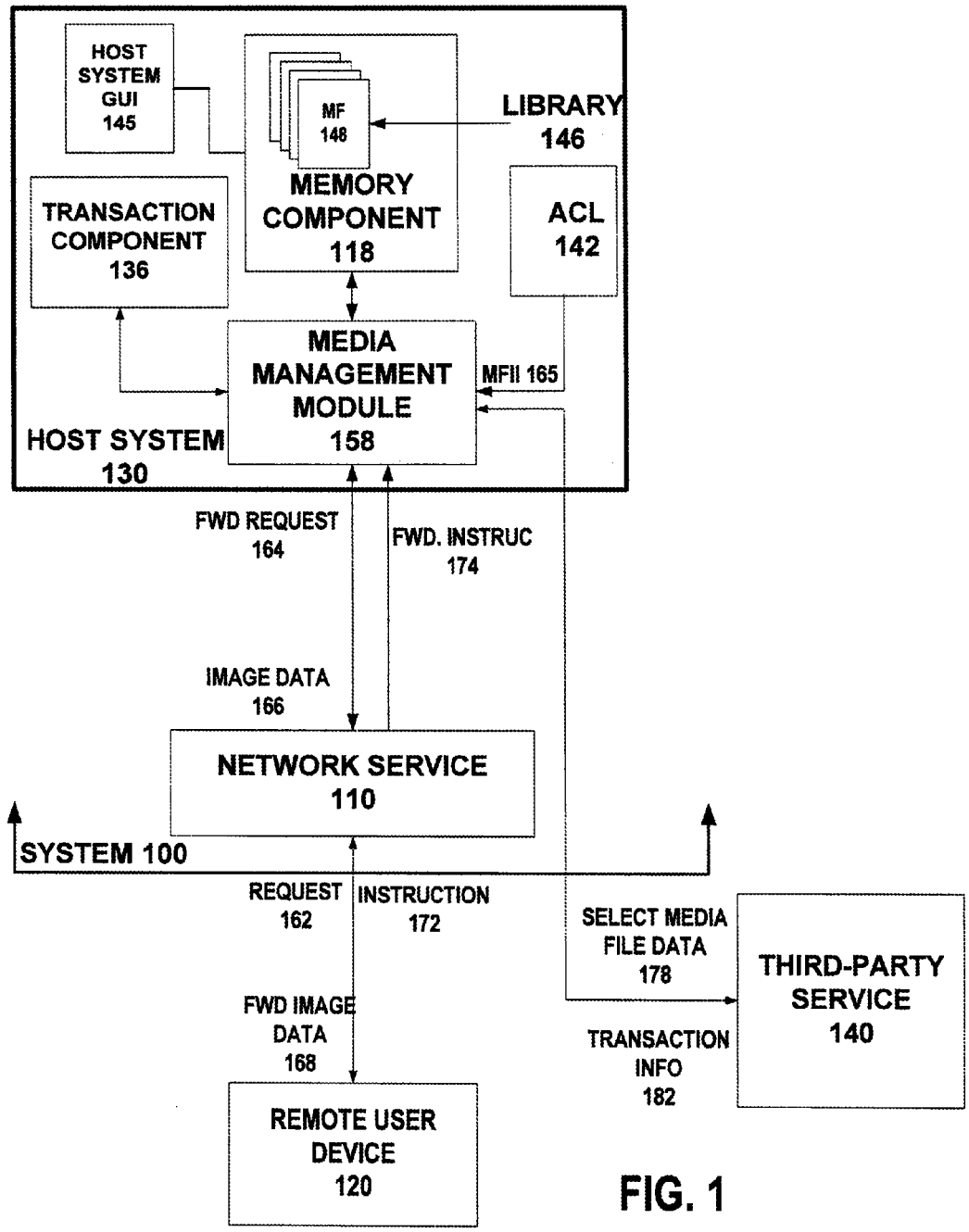
FIG. 1 illustrates a system for the management and distribution of media files, under an embodiment of the invention.

Embodiments described herein provide for a system, method and technique for managing distribution of digital images and other media. In an embodiment, a host computer may store a library of media files, including digital images, such as those captured by a digital camera of a user. One or more applications may run on the host computer, or on an Internet service that communicates with the host computer, in order to enable management, sharing and distribution of images stored on the host computer.

Additionally, an embodiment provides the ability for a remote user to specify instructions that result in operations or actions being performed on digital images stored on the host computer. These actions may be previously permitted or enabled to the knowledge of an end user of the host computer (such as a person in control of the digital images, or an owner of a personal computer on which the images are stored) acting from a remote location, such as on a roaming device or from the Internet. In an embodiment, the user of the remote device may be the same person as the user of the host system, although other embodiments provide that the user of the host system enables numerous guests to have access and perform the actions. The guest may be an end user that is authorized to view the images on the host computer.

In an embodiment, a request may be received from a device that is remote to the host computer. The response to the request may include image data to enable the remote device to render or make viewable a set of images stored on a host computer. A user of the remote device may be enabled to specify one or more actions that are to be performed for images for which he/she is provided image data. In one embodiment, the remote device may be operated to specify or elect one or more programmatic actions that are to be performed on the host computer using media files viewed or selected by the remote device user. The host system user may enable or permit the remote device user to perform the actions. Thus, the user of the remote device is enabled to select one or more images in the set for which the actions are to be performed. The remote device communicates the election for the action to be performed, and the host system performs the actions (or at least initiates performance of the actions) responsively.

The actions may include sending images selected by the user to a particular network location using the Internet and/or other data networks. In one embodiment, the actions may include enabling the remote device user to send copies of the media files to a third-party commercial service, such as a service for printing or producing other forms of media.

The term "image data" means any data that can be rendered or used to formulate a graphic rendition of another image or of a media file (such as video). For example, an output of image data may correspond to a "thumb nail" image, an image with reduced pixel density as compared to an original, or an equivalent copy of the original.

While one or more embodiments described herein is specific to digital photographs, other embodiments may manage, distribute and enable the remote action of other types of media files, including video and/or audio files.

A host computer is any network enabled device on which media files are stored and managed. In one embodiment, the host computer is a personal computer that has media applications and a media library, such as folders in which digital photographs are stored. An example of a host computer is a standard desktop machine that operates MICROSOFT MEDIA CENTER and/or proprietary software provided by ORB NETWORKS.

Numerous embodiments and examples recited in this application specify the use of digital photographs (still images) as the type of media file in use. In addition to digital photographs, other types of media files are contemplated for use with embodiments of the invention. Examples of such other media files include video files, audio/video files and dynamic presentations containing photographs and other media (e.g. slide show).

An embodiment such as described may be performed programmatically, or as a computer-implemented method. Programmatically means through the use of code, or computer-executable instructions.

In an embodiment, the actions that can be specified from the end user include causing or directing the host computer to transfer images selected by the user of the remote device to another location over the Internet and/or other networks. In one embodiment, the remote device user can select to have the images transferred to, for example, a third-party commercial site that handles personal digital images, such as a print service that generates hard copies.

A roaming device may correspond to a device that is network enabled while being mobile, so that is has physical locations and can use different network connections to connect to the Internet. An example of a roaming device is a smart cellular phone, a personal digital assistant with network capabilities (e.g. WIFI or cellular), or a laptop computer that is used with Hot Spots or other locations of Internet connectivity.

One or more embodiments described herein may be implemented using modules. A module may include a program, a subroutine, a portion of a program, or a software component or a hardware component capable of performing one or more stated tasks or functions. As used herein, a module can exist on a hardware component such as a server independently of other modules, or a module can be a shared element or process of other modules, programs or machines. A module may reside on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

FIG. 1 illustrates a system 100 for the management and distribution of media files, under an embodiment of the invention. The system 100 includes a host system 130 and a network service 110, which combine to manage and distribute media files stored in one or more memory components 118 on or available to the system 100. Media files 148 that are to be made available to the management and distribution system 100 may be identified and/or stored in a distribution library 146 on the one or more memory components 118 managed by the host system 130.

In one embodiment, the host system 130 may be in the form of a personal network, as described in U.S. patent application Ser. No. 10/888,606 (incorporated by reference herein). The personal network refers to a network comprising one or more network enable devices of a user. In an implementation of a personal network, each device may be configured with software or otherwise to be aware of the status of another device. Furthermore, each device in the personal network may have knowledge of the functionality and capability of other devices that are pertinent to it. The personal network may extend across multiple networks, and include memory components on third-party sites, or devices that communicate with one another across the Internet.

In an embodiment, the management and distribution system 100 may communicate with a remote device 120 to enable the remote device to view media stored on the host system 130. In one embodiment, media files (such as of digital photographs or video files) that the user wishes to make available to the management and distribution system 100 are stored in the distribution library 146.

In one embodiment, a user of the remote device may be enabled to direct the management and distribution system 100 to perform actions on media files made viewable or renderable on remote device 120. These actions may be enabled by the management and distribution system 100 and/ or the host system 130. Under one embodiment, these actions include the ability of the remote device's user to direct the host system 130 to transfer or otherwise send selected media files that the remote device user has viewed to another network location, such as a third party service. The remote device may be enabled to select what media files are acted on from a set of media files presented. Alternatively, the remote device may be enabled to make an election of the action for the set of media files presented.

In an embodiment, the network service 110 may be provided at a network or website that is accessible from the Internet. The remote device 120 may access the site of the network service 110 using a standard, commercially available web browser. For example, the network service 110 may have a website and a uniform resource locator (URL) that the browser of the remote device can use. The remote device 120 may correspond to a connected device, or a roaming device. The connected device may be any network enabled terminal, such as a workstation or personal computer. The roaming device may correspond to a smart phone that uses a cellular network infrastructure, or a mobile computing device using wireless Internet connectivity (e.g. WiFi).

As will be described, an embodiment provides that the user of the remote device 120 is also the user of the host system 130. One scenario for such an embodiment may be the case where an individual may wish to access his or her connected desktop machine at a residence. Another embodiment provides that the user of the remote device 120 is not a user of the host system 130. A scenario for such an embodiment may be the case where the user of a connected desktop computer or media center wishes to make his or her digital photographs available to friends and family.

Components of the host system 130 include a media management module 158, which interacts with the network service 110 and the distribution library 146. The user of the host system 130 may select individual media files 148 that are to be made accessible to the media management module 158 through association in the distribution library 146. In one embodiment, the management and distribution system 100 is for use by the user of the host system 130, so that the distribution library 146 is only remotely accessible to the user of host system 130. The user can access and view images corresponding to his/her media files from any place where Internet connectivity is available. For example, the user can view all media files in the distribution library 146 from his cell phone, WiFi enabled personal digital assistant (PDA) or lap top, or remote workstation. The user can also direct certain actions to be performed from the remote location, including the transfer of media files to another network location that is external to the network location of the host system 130. For example, the user can transfer the media files to a commercial service that provides hard media (paper prints, coffee mugs, DVD) using digital media. Thus, an embodiment of the invention enables the user to remotely trigger an action to be performed on, for example, a digital photograph. The remotely triggered action may direct the media file to a third-party service 140. As will be described, the management and distribution system 100 may interface with the third-party service 140, so that user interaction after the action is selected is minimal, or non-existent.

In another embodiment, the distribution library 146 is made available to guests and permitted users. In such an embodiment, the host system may maintain an access control list 142 that lists identifiers to individuals or device users who are to be allowed access to distribution library 146, or portions thereof. The user may select folders or specific files for individual permitted users, so that two permitted users may have access to different sets of images. A host user-interface 145 may assist the user in designating images for distribution, and for providing identifiers to permitted guests/users. In one implementation, the host user-interface 145 runs a wizard, or provides other user-interface prompts (e.g. icons, text-entry fields and pull-down menus on a graphical user-interface), to enable the user to establish media files for designation to the distribution library 146.

According to the embodiment, network service 110 and media management module 158 are part of a shared platform. As such, the media management module 158 may form part of a software suite that can be installed on a desktop or media station computer of the host system user. In one embodiment, the media management module 158 acts as a server on a client terminal. For example, the software suite may be downloaded from a web site from which network service 110 is provided. The network service 110 may manage a community of host systems on which the software suite is installed. Once installed, the media management module 158, or some other component, may scan memory components in the user's computer system, home network, or personal network (such as described in U.S. patent application Ser. No. 10/888,606) in order to identify media files that the user can make available for remote management and distribution. Additionally, embodiments provide that the media management module 158 may allow the user to establish a guest list. The guest list may contain identifiers to individuals for whom the user of the host system wishes to make media files available. The host system user may be selective in identifying what media files are to be made available to remote access by a particular individual. The guest list may be in the form of access control list 142, retained in a registry or other data structure managed by media management module 158.

The remote device 120 may access the network service 110 using the Internet. For example, the network service 110 may be provided at a web site available to the remote device 120. When the network service 110 is accessed, the user of the remote device 120 may identify the desired host system 130 from the community. The remote device 120 may then generate a request 162 to initiate a process where select media files 148 in library 146 are made available to the remote device 120.

Either one or both of the network service 110 and host system 130 may authenticate the remote device 120 and/or its user. In order to be authenticated, the remote device user may specify an email address, identifier or moniker as previously designated in the access control list 142. Based on this information, and possibly other information such as the name, moniker, or e-mail address of the host system user, the network service 110 may be able to identify host system 130 from its community as the desired network destination of the remote user. One implementation provides that the access control list 142 is published from host system 130 to the network service 110, and the network service authenticates the remote device user and his or her ability to access the host system 130. In another embodiment, the network service 110 may only verify the identity of the user of remote device 120, and the host system 130 determines what permissions (if any) the remote device user has to view media files 148 and to specify actions that are to be performed on media files 148. As another alternative, all of the authentication determinations may be performed on the host system 130, after the user of the remote device identifies himself to the host system 130 and/or the network service 110.

At some point during or after the process where identification of the user of the remote device 120 and of the host system 130 is made, the network service 110 initiates the request 162. The network service 110 may forward request 162 to the host system 130 in the form of request 164. The request 164 may contain alternative information, such as, for example, identification information of the remote device user and/or confirmation of the identity of the remote device user.

In response to receiving the request 164, media management module 158 may access control list 142 to confirm and/or authenticate the user. Additionally, the media management module 158 may use the access control list 142 to determine what media files the remote device user can view. The media management module 158 uses media file identification information 165 provided from access control list 142 to identify media files 148 from the memory components in the host system 130. In one implementation, the identified media files 148 were previously selected for remote use, and possibly for distribution to the particular user of the remote device 120.

Using the identified media files 148, media management module 158 generates image data 166 corresponding to individual media files identified from the memory components 118. In one implementation, network service 110 receives image data 166 and sends corresponding image data 168 to the remote device 120. The network service 110 may simply relay image data 166 as corresponding image data 168, or network service 110 may perform some process to configure and/or format image data 166 into corresponding image data 168. For example, network service 110 may reformat the image data 166, reduce the image data 166 to accommodate the network bandwidth or device capabilities of the remote device 120, and/or simply buffer and copy the image data 166. Alternatively, some or all actions for configuring and formatting image data 166 may be performed on the host system 130. Furthermore, one or more both of network service 110 or host system 130 may include components for determining the capabilities of the remote device. The image data 168 generated from the network service 110 may be transmitted to a web browser or other rendering component on the remote device 120 to generate a rendition of the media files.

In another implementation, media management module 158 communicates with the remote device 120 directly, or at least without use of network service 110. For example, host system 110 may establish a direct socket communication channel with the remote device 120 when transmitting media files to the remote device. In either case, image data 166 is transmitted and received by the remote device 120, without host system 130 having to upload the image data 166. Thus, no intermediate server or computer is needed to permanently store digital images rendered from image data 166. Since no uploading is needed, the remote device 120 does not need to download the images either.

Numerous variations and implementations are possible for what image data 166 is to contain, and how it is to be transmitted and received by remote device 120. In one implementation, image data 166 corresponds to complete or nearly exact renditions of select media files 148, or to representative renditions of those media files 148. For example, image data 166 may be renderable on the remote device 120 to create substantially exact copies of multi-megabit digital photographs. As another example, image data 166 may represent thumbnails or reduced images (e.g. less resolution or image is reduced in display size). In the case where media files include video, the image data 166 may represent a frame of the video. The image data 166 may form part of an overall presentation, such as a slideshow or digital album or display. As another example, image data 166 may initially contain selectable thumbnails, the individual selection of which cause transport of the media file corresponding to that selected thumbnail over to the remote device 120. In this way, image data 166 enables the user of the remote device 120 to view and comprehend media files on host system 130 that have been made available for that user, without the need to accommodate the entire data size of the viewed media files.

As an alternative or addition to enabling media files to be viewable from remote device 120, embodiments of the invention enable the user of the remote device 120 to instruct the host system 130 to perform actions on the media files stored within the memory components 118. One or more actions that the user of the remote device 120 can elect to have performed may be specified and enabled from the management and distribution system 100 in the form of a user-interface feature, such as a selectable icon, pull-down menu feature or are other graphic element. Data to generate the ability of the user of remote device 120 to elect actions may be specified from one or both of network service 110 and host system 130. In one embodiment, after receiving the image data 168, the remote device user can transmit an instruction 172 that specifies an enabled action and one or more selected or corresponding media files 148. The action specified in the instruction 172 may correspond to the host system 130 transporting data representing the media files to a third-party network location 140. The instruction 172 may be forwarded to the media management module 158, which acts on it. For example, the host system 130 may send media files selected on the remote device 120 to a commercial enterprise provided at a web site corresponding to the third-party network location 140. In an example provided by FIG. 1, a print service 140 is provided at the third-party network location. Thus, remote device user can have the host system 130 send desired media files to the print service for printing on behalf of the remote device user.

In one embodiment, the media management module 158 also determines from the access control list 142 what actions, if any, the user of the remote device may elect to have performed. Thus, to further the example provided, not all users on the guest list can have select digital images and/or have those selected images acted on (e.g. send selected digital photographs to the print service). The user of the host system 130 may be able to specify multiple actions for any given user, such as the ability for the remote device user to select one of multiple print services, the ability for the remote device user to attach text or voice tag, or other action. The user of the host system 130 may use the graphic user-interface 145 provided on the host system 130 to generate the guest list, specify sets of media files or images to be made available to individual guests (or groups), and/or what actions individual guests (or groups) will be allowed to perform. From the presented actions, the user of remote device 120 can make a selection, resulting in action being performed on select media files residing at the host system 130.

The image data 166 may be transferred from host system 130 to remote device 120 with no uploading require from the host system, and no downloading required from the remote user. The network service 110 acts as a broker for the host system 130. In an embodiment in which the user of remote device can select transfer of media files to a commercial enterprise, the network service 110 may serve as the broker in obtaining transactional information from the remote device user. For example, in response to the remote device user selecting to have image files printed at a commercial printing services, network service 110 may generate a series of prompts to cause the remote device user to interact and provide transactional information 182 needed to complete a transaction with the third-party service 140. The prompts may be provided programmatically, at the direction of the network service 110 (or the host system 130) to minimize of completely remove involvement by any person on the host system. The type of transaction information 182 that may be obtained for the print service 110 may include, for example, name, address, credit card information, number of prints needed, size of prints, black and white or color, albums, other products or services and forwards the image data 166 to the remote device 120. The transactional information may be forwarded to the host system 130. In response, the host system 130 may access the third-party service 140.

Transfer to Third-Party Service

The transactional component 136 may operate with the media management module 158 to transfer the media files selected from the remote device 120 to the third-party service 140. In an embodiment shown by FIG. 1, the transactional component 136 may reside on the host system 130, although another embodiment may provide the transactional component to be provided with the network service 110. In an embodiment where the third-party service 140 is a print service, transactional information 182 may necessarily accompany or precede the transmission of select media file data 178, corresponding to the media files 148 selected from the remote device 120. The transactional component 136, and/or the media management module 158, may access and use the transactional information 182 to initiate and/or complete a transaction with the third-party service 140. The transactional information 182 may have been previously entered by the host system user (either for the host system user or on behalf of a guest), or obtained through a series of interactions brokered by the network service 110. The transactional information 182 may include information that specifies payment method, recipient of the service's end product, and preferences or product selection information (as specified by the remote device user, the host system user, or profile/default/information).

Once the transaction is completed, the media management module 158 may transfer the select media file data 178 to the service 140. The select media file data 178 may correspond to data for creating rich renditions of media files 148 selected from the remote device 120. In one embodiment, the select media file data 178 may be transmitted to the third-party service 140 without any uploading of the media files. Rather, one embodiment provides that a peer connection may be made directly with a queue of the third-party service 140 (e.g. queue for printing images by accounts at commercial printers of digital photography). The queue refers to the location of the print service where image files are pulled for printing on availability. For example, with many commercial print services, there is an intermediate server that holds images for a set duration of time. Users must upload their images onto the servers. In an embodiment, no uploading is required, and if there is an intermediate server, it can be bypassed. Another alternative provides that select media file data 178 is messaged (as an attachment or otherwise) to the print service 140.

In an embodiment, the interaction between the host system 130 and the third-party service 140 is substantially programmatic, and without any or much human interaction, either from the user of the remote device 120 or from the user of the host system 130.

Single User Usage Example

One example of how an embodiment such as shown by FIG. 1 is the case where a single user operates remote device 120 and host system 130. The media files 148 may correspond to digital photographs. The user may use remote device 120 to remotely trigger actions to be performed on the host system 130. For example, the user may operate a smart cell phone to view reduced images of his digital photograph library, or portions thereof. The media management module 158 may serve to reduced images to the user cell phone, with programmatic mechanisms to enable the user to trigger a print action. The print action causes the media management module 158 to perform necessary actions for sending select digital photographs to a third-party print service. These actions include accessing the users transactional information (such as his credit card number, account information and/or home address) and filling electronic forms or fields provided by the print service 140. Any choices or selections offered by the print service 140 may be completed by the media management module 158 using default or profile settings. For example, the user may have previously designated a specific photograph size in his or her profile information as the default for images that are to be produced by the print service. The result is that the user can remotely trigger the management and distribution system 100 to programmatically send desired image files to the print service, and to complete (or at least initiate) a transaction resulting in the image files being commercially printed.

Multi-User Usage Example

In another embodiment, a user of the host system 130 may share digital photographs or other media files with friends, family or other desired parties and guests. Additionally, the host system user can enable his guests to perform actions on the image files. A user can designate a folder of images to be viewable (either in full or reduced renditions) to a particular guest. The user may also elect to have the guest have certain privileges to act on the select images. For example, each guest may have the ability to specify that a select digital photograph be transmitted to the print service. The management and distribution system 100 may act on behalf of the guest. In one implementation, network service 110 acts as a broker by obtaining transactional information 182 through interactions with the remote device 120, including information for the guest to arrange payment, delivery of the print orders, and desired quantities, size, or media for the guest's desired photographs. The transactional information is conveyed to the media management module 158, or other component of host system 130, which uses the information to communicate with the print service. An electronic order form of the print service may be completed by host system 130 using the transactional information. The guest's desired print order is then completed by the host system 130.

While an embodiment shown by FIG. 1 provides for the management and distribution system 100 to be distributed between the host system 130 and the network service 110, other embodiments may provide the system 100 to be entirely at one network location. For example, system 100 may reside entirely or substantially within host system 130, and even on one machine that comprises the host system. In such an embodiment, management and distribution system 100 may run as a component on the host system 130. The host system 130 may rely on, for example, establishing a peer-to-peer connection with other remote devices using a direct socket connection or other type of peer or direct connectivity.

Figure 2:
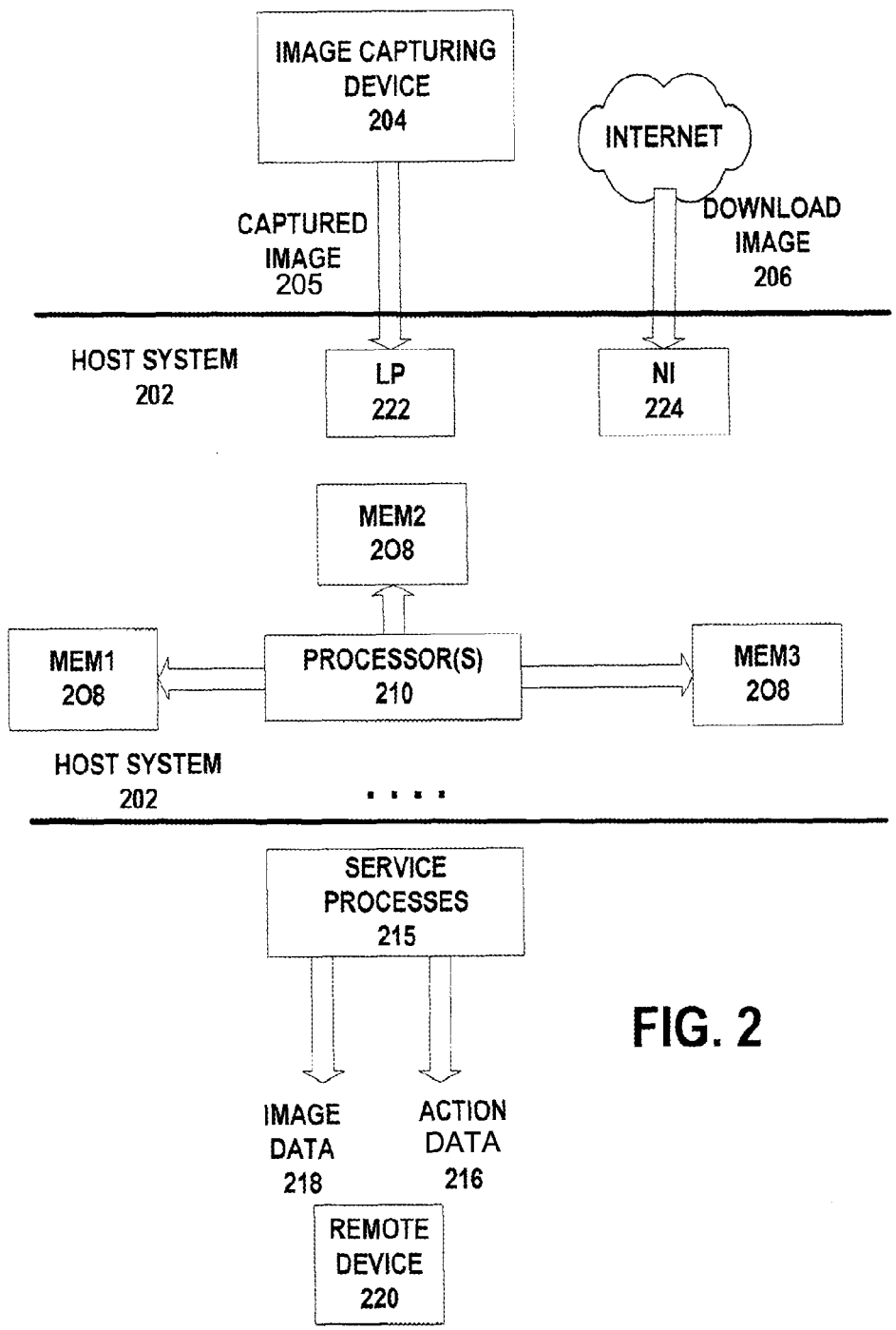
FIG. 2 illustrates hardware and process elements of a management and distribution system, under an embodiment of the invention.

FIG. 2 illustrates hardware and process elements of a management and distribution system, under an embodiment of the invention. In an embodiment, a host system 202 may include one or more processors 210 that have access to a plurality of memory components 208. In one embodiment, the host system 202 is provided substantially on one computing machine, so that the processors 210 and the memory components 208 are contained within the housing of that machine. In such a scenario, the memory components 208 may form a combination of hard drive, flash memory, insertable accessory memory (SmartDisk flash, USB flash), optical media memory etc. In another embodiment, the host system 202 may correspond to a network of devices and machines, such as in, for example, a home network. In such an embodiment, the processors 210 and the memory components 208 may reside on different machines. In another variation, the host system 202 is a personal network, such as described in U.S. patent application Ser. No. 10/888,606. In the personal network, the memory components 208 may reside locally, on a local network, or on a wide area network, such as at an Internet account (YAHOO BRIEFCASE).

In an embodiment, the host system 202 includes a local port 222 and a network port 224. The host system 202 may use the local port 222 to receive transmitted digital photographs and other media files across a local connection. For example, the local port 222 may be used to import captured digital photographs 205 from an image capturing device 204, such as a digital camera. The network port 224 may connect the host system 202 to the Internet, where downloaded images 206 may be obtained. Digital photographs and images may also be received on the host system 202 from other network users across the network port 224. The digital photographs may be stored in the memory components 208.

The host system 202 includes a machine that has one or more of the memory components 208. The host system 202 may be referred to as the originating point for images stored in its memory components, particularly for images that were transferred in from over the local port 222. The originating point refers to the first computer system where a digital photograph (or other media file) is stored for local end user consumption. For example, a photograph downloaded to a user's hard drive (using network port 224), or transferred in from a camera (over local port 222) may be considered photographs for which that computer system is an originating point. Images that were previously uploaded by one end user to an intermediate location then downloaded by another end user would not serve as images for which the computer of the second end user would be termed the originating point. In the example shown by FIG. 2, the host system 202 may serve or include the machine that is the originating computer for downloaded images 206 and imported photographs 205.

One or more service processes 215 may be performed within and/or outside the confines of host system 202 for purpose of enabling the digital photographs and media files stored in the memory components 208 to be shared with multiple other users. For example, the service processes 215 may be performed by one or more processors 210 of host system 202, and/or of the network service (such as shown by FIG. 1) that communicates with the host system 202.

One or more of the service processes 215 may generate image data 218 to enable one or more users of remote device 220 to view renditions (copies, reduction images etc.) of digital photographs and other media files stored in the memory components 208. In one embodiment, the image data 218 may be generated by a first application (running one or more of the processes) that is aware of the media file contents of the memory components. The first application may communicate the images to one or more other processes/applications which then convert and/or configure image data generated from the stored images for transmission to one or more remote devices. As described by FIG. 1, service processes 215 may also include processes/applications for authenticating the users of the remote device, and for determining what image and media files that user is permitted to view (using, for example, an access control list).

According to one embodiment, digital photographs and images for which hosting system 202 is the originating point may be shared with guests that access the host system 202 through the Internet or other data network. The image data 218 conveyed to the guests may replicate the images on their computer systems, or produce variations or alterations of the original images. In an embodiment such as shown by FIG. 1, the image data 218 may be communicated through use of the network service which brokers the data transaction with the user of the remote device 220. The image data 218 may be transmitted from the originating point to a destination on the remote device with no uploading from the host system 202. Specifically, the host system 202 does not upload the images to an intermediate site.

In another embodiment, a peer-to-peer connection may be established between the host system 202 and the remote device 220 for transfer of image data 218. For example, the remote device 220 and the host system 202 may be equipped with a peer-to-peer application or capability.

The user of the host system 202 may also enable the remote device 220 to select or elect actions that the remote device user can trigger. Action data 216 may be transmitted using the processes 215 to enable the remote device to perform the actions. Any action the user of the remote device 220 can perform may be previously designated or permitted from processes 215. If the remote device user elects to perform the action, the action is performed at least initially within the confines of the host system 202, using the digital photographs as stored on the memory components 208. For example, the guest operating the remote device may elect to have a digital photograph printed, using functionality established on the remote device by action data 216. Election of the action instructs the host system 202 to perform the action. This may include copying the original photograph, and packaging it for delivery to the print service.

The ability of the user of the remote device 220 to view digital photographs from the host system 202 and specify actions to be performed on those photographs may be programmatically established. Thus, the use of the host system 202 does not need to know when the remote device user attempts to view images, or perform actions on them.

Methodology

Figure 3:
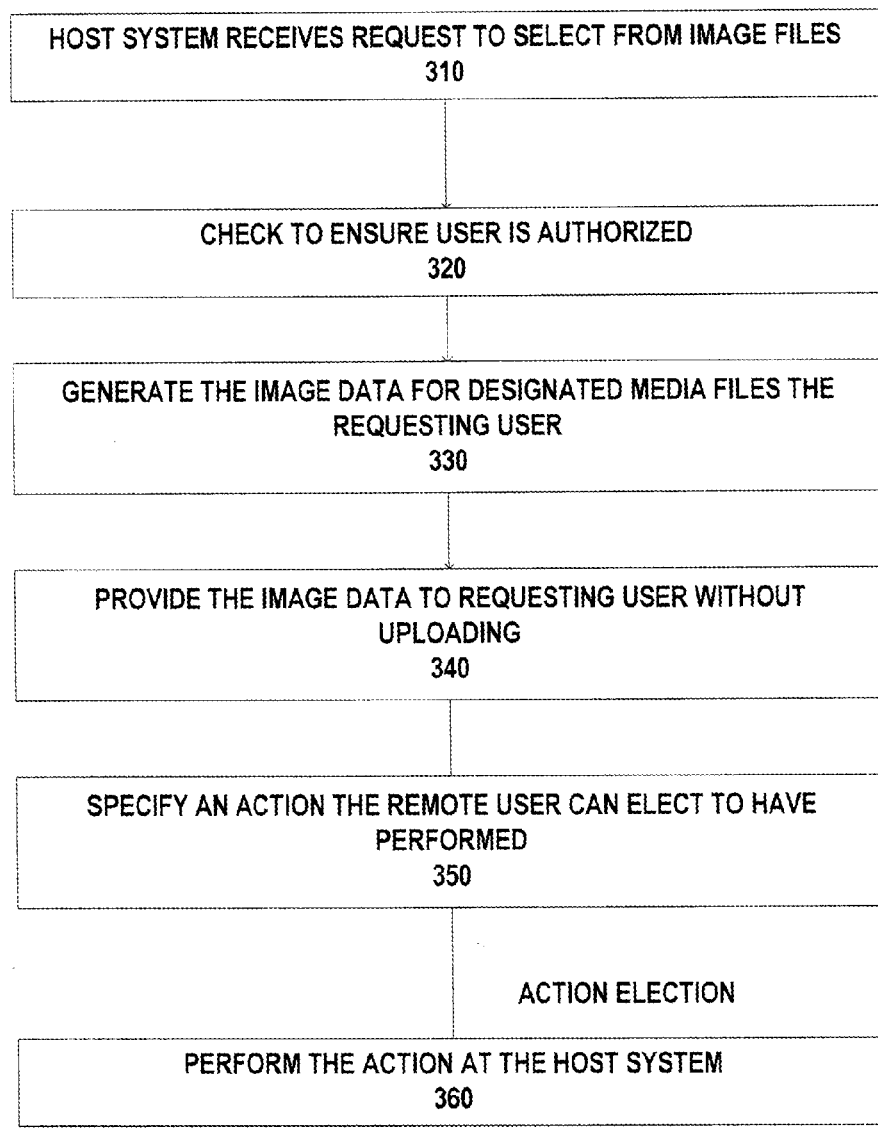
FIG. 3 illustrates a method for managing distribution of media files on a host system under an embodiment of the invention.

FIG. 3 illustrates a method for managing distribution of media files on a host system under an embodiment of the invention. A particular type of media contemplated with examples in FIG. 3 are digital photographs. In describing an embodiment of FIG. 3, reference may be made to elements of FIG. 1 for the purpose of illustrating suitable elements for performing a step or sub-step.

In step 310, host system 130 receives a request from a remote device 120 to select from image files stored under the management of the host system. As mentioned with, for example, embodiments of FIG. 1, the request may originate from the user of the host system 130 operating a remote device, or from a guest user of the host system 130.

A check may be performed in step 320 to ensure the request the user is authorized. The access control list 142 may be referenced. The identifier used can be one of design implementation. For example, any user may need to specify a log-in and password, and/or e-mail address, matching a record contained in the host system user's access control list 142.

Step 330 provides the image data is generated for designated media files. An embodiment provides that the host system user can specify and select images that can be viewed remotely. Another embodiment provides that the host system user can select different images or image sets for different remote users.

In step 340, image data corresponding to the designated media files are provided to the remote device from which the request was made. In one embodiment, the image data is provided to the remote device without the need for transferring the image data to intermediate memory location where the remote device can perform a retrieval. Rather, the image data may be transmitted to the remote device without uploading the image data onto the intermediary. The image data may be transmitted through a peer connection with the remote device (such as established through peer server/client applications executing on two terminals), or relayed through the network service. According to an embodiment, neither case requires an upload to be performed.

Along with transmission of image data, in action the remote user can perform may be specified in step 350. The user of the remote device may elect to have the action performed. If the user elects the action to be performed, the action 360 is performed programmatically on the image files residing at the host system 130. For example, the images on the host system may be copied for transmission to the third party service or network site.

Figure 4:
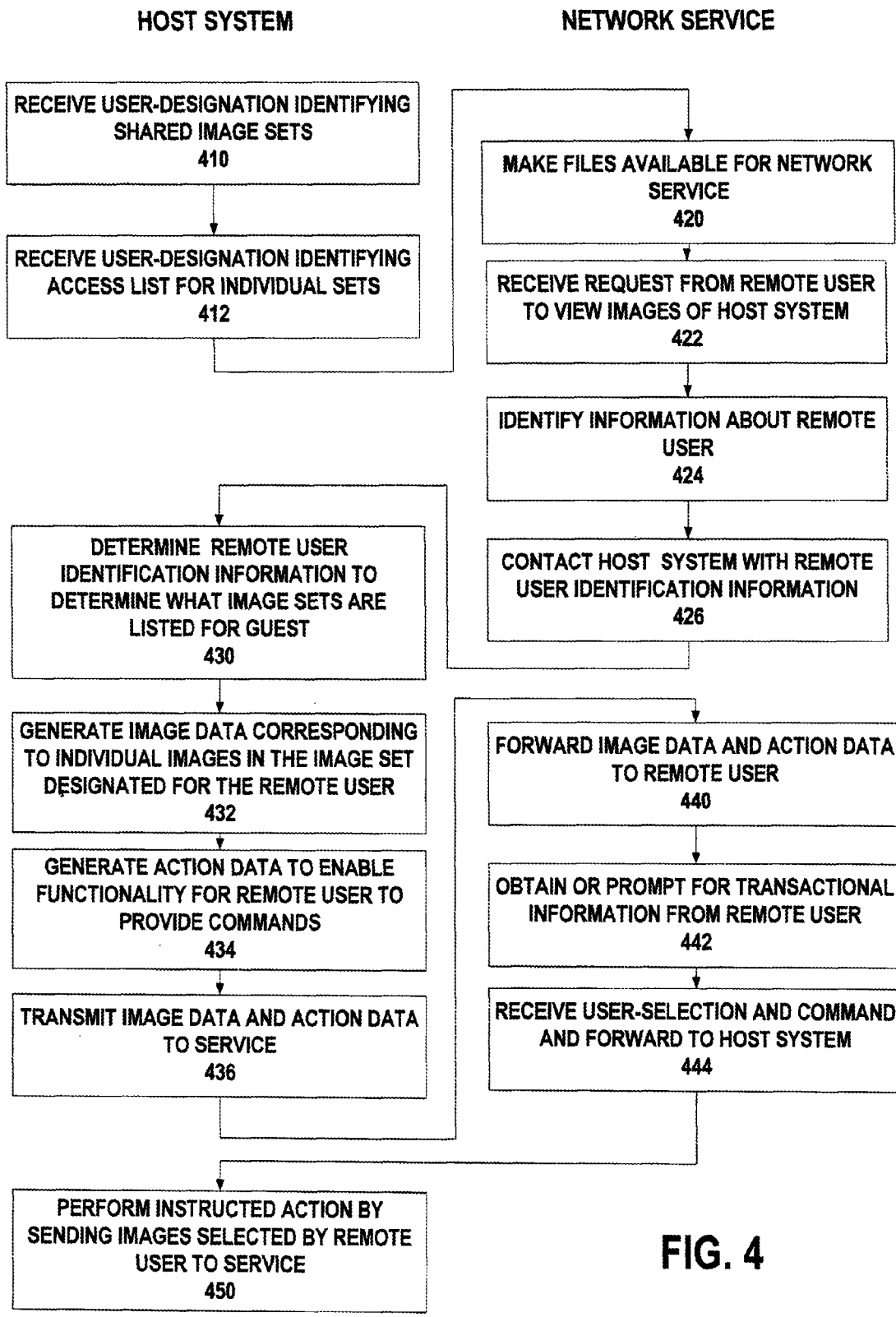
FIG. 4 provides a more detailed method by which digital photographs can be distributed from a host system for consumption and use remotely, including by guests, under an embodiment of the invention.

FIG. 4 provides a more detailed method by which digital photographs can be distributed from a host system for consumption and use remotely, including by guests, under an embodiment of the invention. A method such as described by FIG. 4 may be performed using a system such as described in either FIG. 1 or 2. In particular, a method as described in FIG. 4 may be performed with management and distribution system 100, using host system 130 and network service 110. However, reference to numerals of FIGS. 1 and 2 are for purpose of illustrating suitable components and elements for purpose of performing a step or substep.

In step 410, a user-designation is received which identifies a set of shared image sets. For example, a user may identify a particular folder on a media center terminal as one that is to be shared with a class of users, then copy images into the folder.

Step 412 provides that the user defines who is in a class, or is otherwise granted permission to a particular folder. Different classes of people may be designated to different folders. The host system user may identify individuals by any identifier, including email address, instant-message handle, name, log-in, and possibly password. In one embodiment, the host system user provides identifiers for guests so that any guest who accesses the network service will receive a prompt or question, the answer for which will match what the user has used for that guest's identifier. For example, the network service 110 may request a potential guest's email address and name, then be able to match the responses to what the host system user provided.

In step 420, the network service 110 may make files available for network access by permitted remote users. For example, a process executing on the host system 130 or with the network service 110 may identify the folder, and pre-configure the files corresponding to the digital photographs for transport across the Internet, and/or to specific end devices. Additionally, the host system 130 may communicate some or all of its access control list to the network service, sufficient to enable the network interface 110 to broker one or more identification operations on behalf of the host system 130.

At a subsequent time, step 422 provides that the network service 110 receives a request from a remote user for access to the host system 130. For example, the network service 110 may receive an Internet communication from the remote device used by the requester.

The network service 110 may identify information about the requestor, in order to determine whether the requester is permitted to access the host system 130. In one implementation, the network interface 110 may prompt the user for one or more responses (e.g. name or email address), and then compare the responses to an access control list completed by the user of the host system 130.

In one scenario, the network service 110 handles numerous host systems 130, and the identification process from the requester also enables the network service 110 to determine which particular host system the requester seeks. Alternatively, the requester makes the identification of the host system 130. Once the host system 130 is identified, the network service 110 may use a known network address to establish communication with the host system 130. The network service 110 may forward the identification of the requester and/or the request to the host system 130.

In step 430, the host system 130 uses the communication from the network service 110 to determine (i) what images are folders are available to that requestor, and optionally (ii) if any actions will be permitted by the requester. The host system 130 may reference the identification from the requester with the access control list 142, which contains the stored instructions of the host system as to the permissions of the requester.

Responsive to the request, step 432 provides that image data is generated from the digital photographs stored on the host system. The image data may be designated for the requestor, or a class that includes the requester. In one embodiment, the image data is a substantial reduction of the original digital photographs, such as a thumbnail.

In addition to image data, step 434 provides that action data may be generated to establish functionality on the remote device of the requester. The established functionality may be to enable the remote device of the requestor to perform a designated action, or set of actions. Both the image data and the established functionality may be configured to be received and used on the remote device through use of a web browser.

In step 436, image data and/or action data are transmitted to the network service, for delivery to the remote device. In step 440, the network service forwards the image data and the action data to the remote device. The network service 110 may supplement or produce one or both of image data and action data. No upload is performed at the network service or anywhere else prior to the network service relaying the image and action data to the remote device. Rather, one embodiment provides that the communication is transmitted responsively to the web browser of the requestor (in response to the request being made). Another embodiment provides that a peer connection is established to transmit the image and action data. In one variation, both the host system and the remote device run an application to enable a peer-to-peer connection.

The image data may be rendered on the remote device in the form of a preview or thumbnail image, although it is possible for the image data to be rich replicate or copy of the original. In one implementation, the action data is provided on the remote device in the form of a selectable icon. The remote device user may make a selection of a particular digital photograph, and an election to have a designated action performed at the host system, on behalf of the remote device. If more than one action is provided for the remote device user, the user may make a selection of what action or actions should be performed. In an example provided by FIG. 4, the action that the remote device user can elect to perform is to have select digital photographs sent to a commercial print service. The remote device user may make the selection of a particular image by performing a user-interface select operation on individual renditions of the desired images provided from the host system. For example, the remote device user may select the thumbnail of the desired image similar to an icon, or fill a check box field next to another image. The remote device user may elect the action by clicking an icon, or performing some other similar action through the user-interface provided on the remote device.

Assuming the remote device user elects to have select images printed, an embodiment provides that in step 442, the network service 110 performs several operations to broker a transaction between the user of the remote device and the print service. In one embodiment, the network service prompts the remote user to enter information for completing the transaction, including payment information, name and address of delivery. In another embodiment, the network service 110 directs the remote device user to a third party transaction service (may be same of different than print service) to enable the remote device user to complete the transaction.

In step 444, a selection and instruction from the remote device are forwarded to the host system 130. The selection specifies what images the remote device 120 wants actions to be performed on. The instructions elect the action offered, or select a particular one of multiple actions made possible. In the example discussed, the action is to send select digital photographs to the third-party print service. The network service 110 may provide any transactional information obtained from the remote device 120 to the host system 130. As one alternative, the network service 110 may establish an order has been placed for the remote device user with the print service.

In step 450, the action specified from the remote device 120 is performed on the original files from within the host system 130. In one embodiment, the actions are initiated on the original stored file, or a local copy of that file. In the example provided, the action performed may correspond to digital photographs presented to and selected from the remote device 120 being sent to a network location of a print service. In one embodiment, a connection and/or relationship may be established with the print service from either the network service 110 or the host system 130 to enable the host system's transmission to transfer images to the print service with no intermediate uploading step. In one embodiment, the host system 130 (or alternatively the network service 110) is configured to contact the print queue of the printer service. For example, the host system 130 may have a network address of the print queue pre-configured for its transmissions when instructed. Additionally, the host system 130 may transfer select images to the print queue through a peer type communication, or alternatively by serving the select images to the queue, so that no uploading process is performed in order to make the print service print the digital photographs. The host system 130 (or alternatively the network service 110) may have established between them a socket communication channel to facilitate the data transfer without uploading. Any intermediate server to receive uploads for the print service may be bypassed.

While FIG. 4 illustrates particular steps or operations being performed on one of the host system 130 or network service 110, any or all of the steps shown may be performed on either of the host system or network service. For example, a method such as described by FIG. 4 may be performed entirely using processes executing on the host system 130, or entirely using processes executing on the network service 110.

Additionally, the particular order for steps recited in FIG. 3 or FIG. 4 is one of design implementation. Performance of the steps in either method is not order-dependent. One or more steps illustrated above may be performed through programmatically implemented steps, including through automated computer responses and actions.

Remote Display Examples

Figure 5:
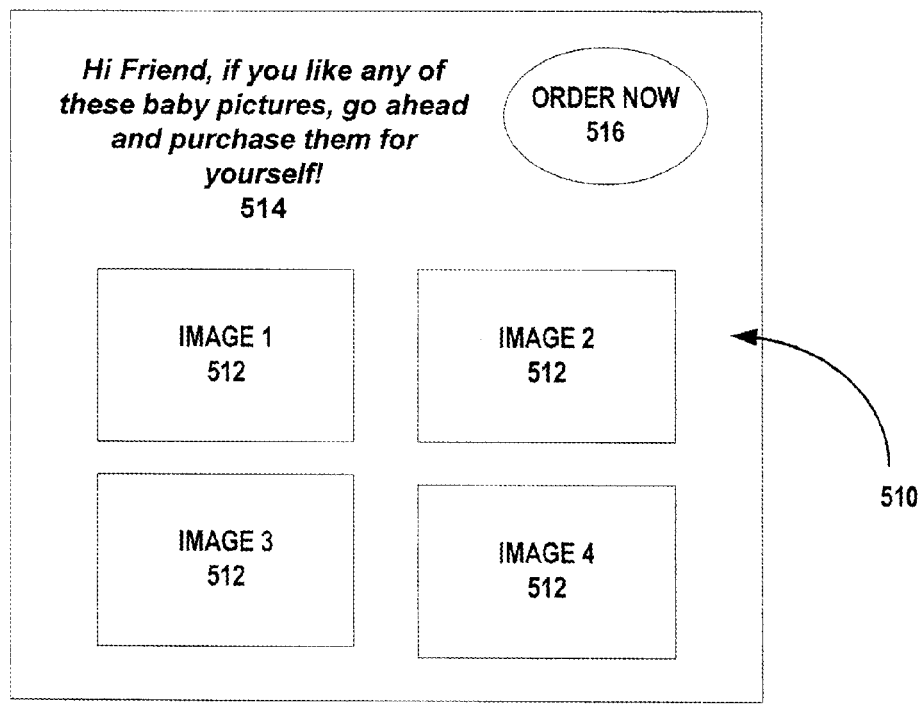
FIG. 5 illustrates an example of content and information generated on a remote device by the host system transmitting image data and action data, under an embodiment of the invention.

FIG. 5 illustrates an example of content and information generated on a remote device by the host system 130 transmitting image data and action data (either directly or through use of the network service). In FIG. 5, a presentation 510 on a display of a remote device is shown, tailored for a user that is a guest of the host system 130. The presentation includes images 512, each of which correspond to a media file stored at the host system 130. A personalized message 514 may be displayed to the user (optionally specific to the user).

An action icon may also be presented to enable the user to have a designated action performed on one or more of the media files corresponding to the individual images. As described with other embodiments, the action that can be performed from the remote device is to cause the media files represented by the images 512 to be sent to a print service. The remote device user can specify the print action without having to upload the images himself, or have the remote device upload any images. The images are transferred to the printer service from the host system 130.

Figure 6:
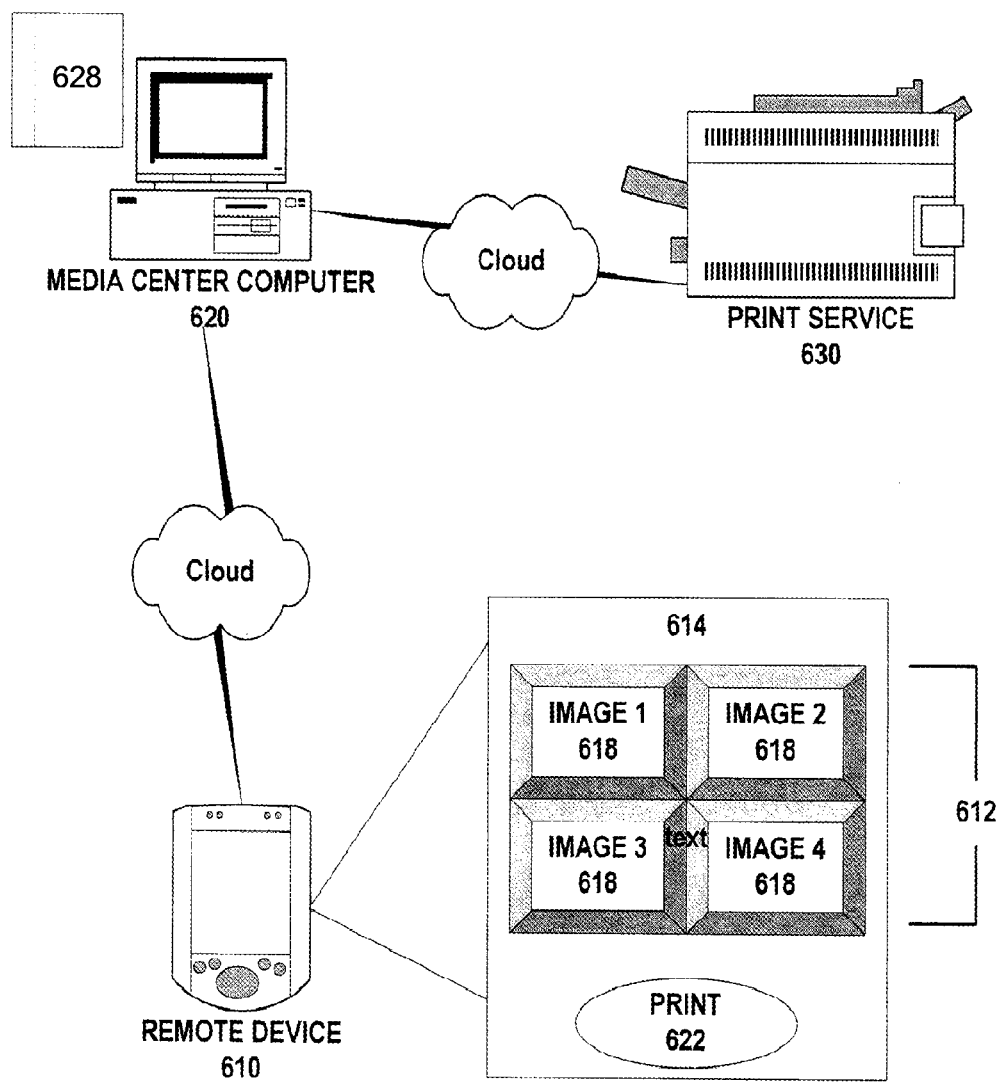
FIG. 6 illustrates another example of how an embodiment of the invention may be implemented, according to an embodiment of the invention.

FIG. 6 illustrates another example of how an embodiment of the invention may be implemented, according to an embodiment of the invention. In FIG. 6, a remote device 610 corresponds to a PDA or small form factor a mobile computing device capable of Internet connectivity (an example of a roaming device). A presentation 612 on a display 614 of that device includes multiple thumbnails 618 (or reduced images), each of which represent a digital photograph 628 stored on the media center computer 620. The remote device 610 and the media center computer 620 may communicate across the Internet, either directly or indirectly through, for example, the network service (such as illustrated in FIG. 1).

The user of the remote device may correspond either to the same user of the host system (provided on media center computer 620), or a guest of the user of the media center computer 620. By making the selection of the thumbnail 618, and/or of the command icon 622 (for printing), the user of the remote device 610 can direct the media center computer 620 to forward digital photographs to a print service 630. Any transactional information needed from the printer service 630 may be provided through either the media center computer 620 (as stored information, or through prompts with the remote device 610), through a broker (e.g. the network service or a third party payment service), or directly from the remote device (in coordination with the remote device providing the command). The transfer of digital photographs from the media center computer 620 to the print service 630 may also be over a data network such as the Internet.

In an embodiment, communications between the media center computer 620 and the remote device 610 require no upload. Thus, in one implementation the images 618 may be rendered though a browser that runs on the remote device 610. The remote device user can utilize the media center computer 620 to forward for printing any of the images 618. Thus, from the perspective of the remote device user, images 618 are forwarded to the print service with no uploading. Even if an upload is performed from the media center computer 620, the upload is transparent to the user of the remote device 610, as the action is performed from the media center computer 620 on behalf of the remote device user. However, as described with other embodiments, the media center computer 620 also performs no upload in transferring images 618 to the print service 630.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method for managing distribution of media files, the method being implemented by one or more processors and comprising:
    enabling a source computer that is part of a personal network of a user to allow a remote computing device that is external to the personal network to access and act upon a set of media files residing on the personal network, without uploading the set of media files to an intermediary server or computer, by configuring the source computer to perform steps comprising:
    scanning the personal network of the user to identify media files that can be shared and acted upon by the remote computing device, the personal network of the user including the source computer and one or more other devices;
    receiving a request from the remote computing device to access the set of media files;
    sending data that corresponds to each media file in the set to the remote computing device using a network and without use of an intermediary server or computer;
    enabling a user of the remote computing device to communicate with the source computer to specify one or more actions that are to be performed or initiated on the source computer for any of the one or more media files in the set; and
    initiating performance of the one or more actions specified by the remote user;
    wherein the one or more specified actions include sending at least portions of the selected media files to a particular network location specified by the user of the remote computing device, and wherein the particular network location is external to the personal network.

2. The method of claim 1, wherein initiating performance of the one or more actions includes directing the source computer to transfer the selected media files in the set to a service that creates products from the media files.

3. The method of claim 2, wherein the service is a print service, and wherein initiating performance of the one or more actions includes causing selected images corresponding to the media files to be sent to the print service.

4. The method of claim 3, further comprising performing one or more programmatic operations to complete a transaction with the print service for the selected images.

5. The method of claim 4, wherein performing one or more programmatic operations to complete a print transaction includes using transactional data belonging to a user of the source computer.

6. The method of claim 4, wherein performing one or more programmatic operations to complete a print transaction includes using transactional data belonging to the remote user.

7. The method of claim 2, wherein directing the source computer to transfer the selected images in the set includes enabling the source computer to complete a transaction with the service programmatically on behalf of the user of the device.

8. The method of claim 1, wherein enabling the remote user of the remote computing device to specify one or more actions includes:
    generating a selectable user-interface feature on the remote computing device; and
    associating the one or more actions to the selectable user-interface feature prior to generating the selectable user-interface feature, so that selection of the selectable user-interface feature on the remote computing device signifies an intent of the remote user to have performance of the one or more actions at least initiated on the host computer.

9. The method of claim 8, wherein the selectable user-interface feature is a selectable icon.

10. The method of claim 1, wherein sending data includes generating data for viewing reduced representations of each image in the set.

11. The method of claim 1, wherein enabling the remote user includes identifying at least one of the remote computing device or the remote user in order to determine whether the remote user is authorized by the user of the host system.

12. The method of claim 1, wherein the remote computing device is a roaming device.

13. The method of claim 12, wherein the roaming device transmits the request over a cellular communication network, and wherein enabling the remote user and sending the data are performed using the cellular communication network.

14. The method of claim 13, wherein sending the data over the cellular communication network includes reducing the data for at least one of a bandwidth of the cellular communication network and a display of the roaming device.

15. The method of claim 1, wherein the set of media files includes one or more video files.

16. A system for managing distribution of media files that are stored on a personal network of an end user, the system comprising:
    multiple machines of the end user that are interconnected by a network to form the personal network;
    multiple memory components provided by the multiple machines;
    wherein the multiple machines are each configured to present the multiple components as a combined memory for use on the personal network;
    wherein the multiple machines store a collection of media files amongst the plurality of memory components;
    a media manager module, executing on one or more of the multiple machines, the media manager module being configured to programmatically respond to a request from a remote device that is external to the personal network to act on a selected media file by:
    accessing any one of the memory components that form the combined memory to retrieve the selected media file;
    generating data corresponding to the selected media file; and
    causing the data to be transmitted from the one or more multiple machines, without uploading the one or more media files to an intermediary server or computer, to a location specified by a user of the remote device, wherein the location is external to the personal network.

17. The system of claim 16, wherein the request is generated from a roaming device, and wherein the media manager module is configured to cause the data to be transmitted to the roaming device.

18. The system of claim 16, wherein at least one of the multiple machines includes a data structure on which an access control list specified by the end user of the personal network is provided, and wherein the media manager module is configured to (i) determine an identifier of the user of the remote device, and (ii) check the access control list to determine whether the user of the remote device has permission to receive the data.

19. The system of claim 18, wherein the access control list identifies a plurality of guest users, and wherein the media manager module is configured to cause the transmission of the data to any one of the plurality of guest users.

20. The system of claim 16, wherein the media manager module configures the data to be renderable using a browser of the remote end user.

21. The system of claim 16, wherein the media manager module is configured to:
    receive one or more instructions from the remote device to perform an action that is to be performed on the selected media file;
    perform the action on the selected media file.

22. The system of claim 21, wherein the action corresponds to sending one or more copies of select media files to a network location that is different than a network location of the remote device and external to the personal network.

* * * * *